United States Patent [19]

Takeoka et al.

[11] Patent Number: 4,478,768
[45] Date of Patent: Oct. 23, 1984

[54] METHOD FOR MANUFACTURING OPTICAL TYPE RECORDING MEDIUM

[75] Inventors: Yoshikatsu Takeoka, Kawasaki; Nobuaki Yasuda, Zushi, both of Japan

[73] Assignee: Tokyo Shibaura Denki Kabushiki Kaisha, Kawasaki, Japan

[21] Appl. No.: 473,244

[22] Filed: Mar. 8, 1983

[30] Foreign Application Priority Data

Mar. 15, 1982 [JP] Japan ................... 57-39432

[51] Int. Cl.³ ............................................ B29D 17/00
[52] U.S. Cl. ..................................... 264/1.4; 264/106; 264/107
[58] Field of Search ............... 264/1.4, 1.7, 106, 107, 264/22, 25; 425/810

[56] References Cited

U.S. PATENT DOCUMENTS 4,141,731 2/1979 Jarsen ................................. 264/106
4,188,240 2/1980 Yoshio ............................... 264/107

FOREIGN PATENT DOCUMENTS 0022313 1/1981 European Pat. Off. .
0058496 8/1982 European Pat. Off. .
2061595 5/1981 United Kingdom .

OTHER PUBLICATIONS

"Optical Disk Systems Emerge" IEEE Spectrum, vol. 15, No. 8, pp. 20-28, Aug. 1978, Bartolini et al.

Primary Examiner—Donald Czaja
Assistant Examiner—V. Fischbach
Attorney, Agent, or Firm—Oblon, Fisher, Spivak, McClelland & Maier

[57] ABSTRACT

A specific laser-sensitive layer is formed on a substrate so as to manufacture an original disk. The laser-sensitive layer absorbs energy from a laser beam and locally expands and deforms. The laser beam which has a predetermined beam energy to indicate pretrack information for, for example, a self-write/read type optical disk, is used to irradiate the laser-sensitive layer. A spiral projected pattern is locally formed on the laser-sensitive layer, such that a gas is discharged from laser-incident portion which then expands and deforms. A structure so obtained is used as an original disk.

17 Claims, 15 Drawing Figures

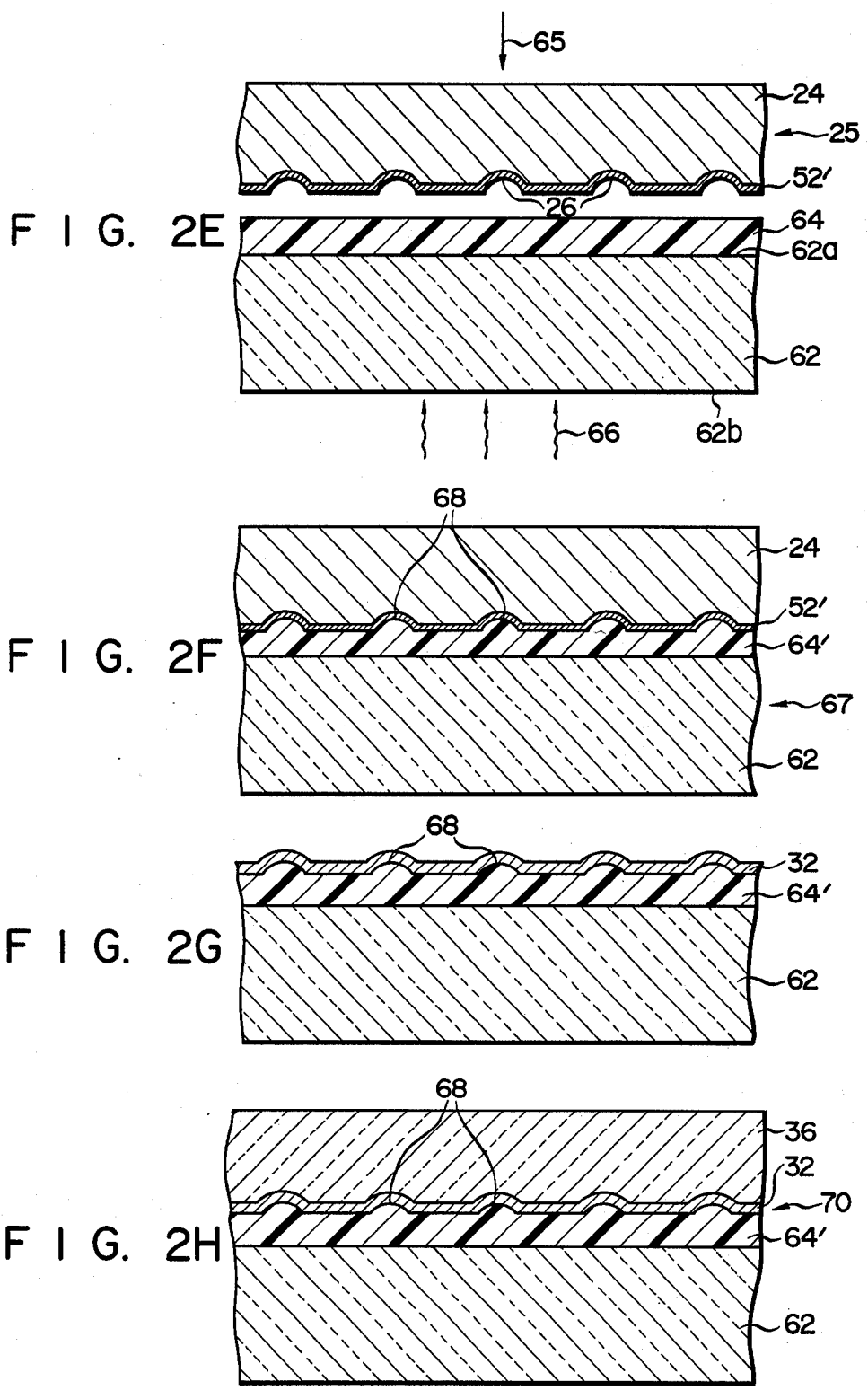

METHOD FOR MANUFACTURING OPTICAL TYPE RECORDING MEDIUM

BACKGROUND OF THE INVENTION

The present invention relates to a method for manufacturing an optical type recording medium and, more particularly, to a method for manufacturing an information recording medium such as an optical disk on which information is written using radiation such as a laser beam.

It is known to preform a track comprising a continuous spiral indentation in a substrate of a recording medium such as an optical disk, and to perform tracking by a servo mechanism in accordance with a difference between reflectances of the track portion of the substrate of the optical disk and the remaining flat portion thereof. In the case of writing data on or reading it out from a conventional optical disk having a track comprising a continuous spiral indentation (also called a "pregroove"), the tracking control technique of the type described above is very effective in accurately tracing the track with an optical head. In this case, information or data is stored in the form of holes called recording pits in a recording layer. These recording pits are formed by focusing the recording laser beam on the pregroove of the optical disk of the type described above.

The shape and size of the pregroove of the optical disc are properly determined so as to increase the precision of tracking control. In order to achieve high tracking control precision, it is necessary to considerably increase the level of an error signal generated when the laser beam (write or read beam) spot is undesirably deviated from the pregroove. Furthermore, the shape and size of the pregroove of the optical disk are also determined so as to efficiently provide reflected light which indicates the presence or absence of recording pits on the optical disk, in order to increase the level of a data read signal from the optical disk along the pregroove thereof. Therefore, it is preferred that the pregroove in the optical disk be formed uniformly over the entire area of the optical disk so as to have a groove width of not more than 1 $\mu$m and a groove depth of about $\frac{1}{8}$ the wavelength of the laser beam used (e.g., about 0.1 $\mu$m).

Conventionally, an optical disk with a continuous spiral pregroove or track is manufactured as follows. A chromium film is formed on a top surface of a transparent substrate comprising disk-shaped glass (of, e.g., 300 mm diameter). A photoresist material is applied by a spinner or the like to the surface of the chromium film, thus forming a photoresist film. The substrate having the photoresist film formed thereon in a manner described above is then rotated at a predetermined speed. The laser beam is then focused to irradiate the photoresist film of the rotating substrate so as to form a beam spot of 1 $\mu$m in diameter. This laser beam is moved at a constant feed speed along the radial direction of the rotating disk-shaped substrate. When irradiation by the laser beam is completed, the structure exposed to the laser beam is etched, thereby obtaining an original disk which has a continuous spiral pregroove. The track may alternatively comprise a projection or ridge, depending on the type of photoresist material. Electrodes are deposited on the original disk, and an obtained structure is subjected to electroforming. A disk structure having a transferred indentation of the original disk is separated therefrom to form a stamper. Then, a desired resin disk is obtained using the stamper, and thus, a final optical disk is manufactured.

However, in the conventional method described above, it is very difficult to uniformly form the spiral track portion to have a width of 1 $\mu$m and a depth of 0.1 $\mu$m over the entire surface of the disk-shaped substrate of 300 mm in diameter. In general, when the photoresist material is applied to the substrate to form a photoresist film having a thickness on the order of microns, the photoresist film tends to partially peel off from the disk-shaped substrate. As a result, uniformity of the film cannot be expected. In particular, when the photoresist film is formed to have a thickness on the order of submicrons, the photoresist material is diluted before being applied to the surface of the substrate. As a result, the uniformity of the photoresist film is further degraded, and irregular development and etching occur. Nonuniformity occurring at the beginning of the disk manufacturing process results in a definite fault in the optical disk. In this manner, a spiral track having the dimensions described above over the entire surface of the substrate of the optical disk is extremely difficult to form.

SUMMARY OF THE INVENTION

It is an object of the present invention to provide a method for manufacturing an optical type recording medium which will allow easy manufacture of a record carrier body such as an optical disk having a radiation-sensitive layer with an indentation pattern corresponding to data (track data and write data).

According to a method of the present invention, a radiation-sensitive layer is formed which absorbs energy from an energy beam such as a laser beam radiated onto the substrate, and which locally expands and deforms in accordance with the energy of the beam. This radiation-sensitive layer is a single layer which is made of a material which absorbs the energy of the beam radiated onto the substrate and is locally deformed outward at a portion where a gas component is freed in accordance with the absorbed energy. Subsequently, the radiation-sensitive layer is irradiated with the energy beam, so that a projected pattern is formed on the radiation-sensitive layer. As a result, a record carrier body is formed which stores information corresponding to radiation of the beam. This information may include pretrack information for self-write/read type optical record media, or recorded information for read-only optical recording media.

BRIEF DESCRIPTION OF THE DRAWINGS

The present invention is best understood by reference to the accompanying drawings, in which.

DETAILED DESCRIPTION OF THE PREFERRED EMBODIMENTS

Figure 1A:
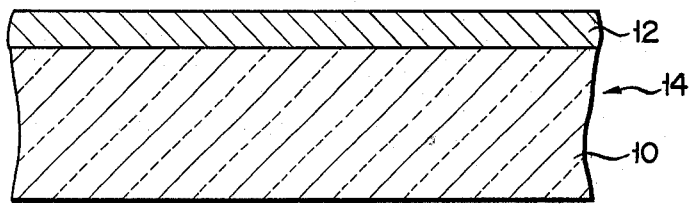
FIG. 1 illustrates, in schematic cross-section, some of the major steps in manufacturing an optical disk according to a first embodiment of the present invention.

Referring now to FIGS. 1A to 1G, the main steps in manufacturing an optical disk having a preformed self-write/read track thereon are schematically illustrated according to a first embodiment of the present invention. As shown in FIG. 1A, a round disk-shaped substrate 10 of a transparent material such as glass is formed to have a diameter of 300 mm. A laser-sensitive layer 12 serving as a recording layer is formed on the top surface of the substrate 10. The laser-sensitive layer 12 is made of a material which absorbs energy from the laser beam radiated thereon and which is locally deformed by gas discharge in accordance with the absorbed energy. The recording layer 12 is preferably made of a material consisting of: one or more low-melting point metals such as tellurium (Te), antimony (Sb), bismuth (Bi), indium (In), cadmium (Cd), zinc (Zn) and lead (Pb); and one or more elements which may be readily vaporized below a predetermined temperature (about 400° C.), such as nitrogen (N), carbon (C), hydrogen (H), oxygen (O), phosphorus (P), iodine (I), bromine (Br) and sulfur (S). In this embodiment, the layer 12 is made of a material having a composition of $Te_{60}C_{30}H_{10}$ and is formed to a thickness of 3,000 Å by plasma sputtering using $CH_4$ gas plasma and Te as a target.

A disk-shaped structure 14 shown in FIG. 1A is rotated at a constant speed. A continuous beam 15 of a GaAlAs laser having a wavelength of 8,000 Å is focused on the layer 12 to have a beam spot of 1 $\mu m\phi$. The GaAlAs laser beam 15 is moved at a constant speed in the radial direction of the structure 14 of FIG. 1A. In this embodiment, the structure 14 was controlled to be constantly rotated at 6 m/sec. The GaAlAs laser beam 15 had a power of 10 mW.

Figure 1B:
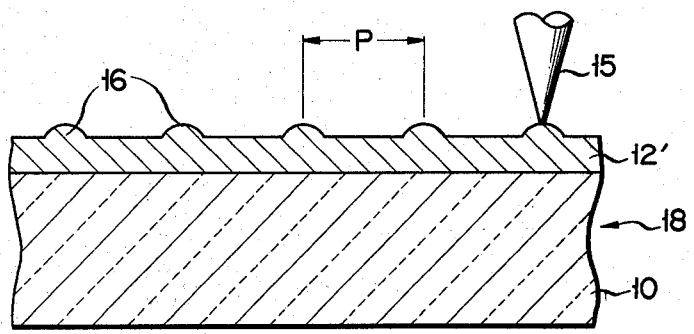

As described above, the beam 15 is moved along the radial direction of the disk-shaped structure 14 and irradiates the layer 12 of the structure 14. Spiral projections or tracks 16 are formed in the top surface of the layer 12 of the substrate 10. The projections 16 are formed by the layer ($Te_{60}C_{30}H_{10}$ layer) 12 absorbing energy from the GaAlAs laser beam 15 and discharging a gas in accordance with the absorbed energy. FIG. 1B shows a cross-section of a disk-shaped structure 18 along the radial direction thereof. Continuous spiral projections 16 were formed in the top surface of the layer 12 of $Te_{60}C_{30}H_{10}$ on the substrate 10. Each projection 16 had a width of 1 $\mu$m and a height of 0.1 $\mu$m. The spiral projections 16 were uniformly formed over the entire surface of the layer 12. The pitch of the adjacent spiral projections 16, that is, a distance P (FIG. 1B) along the radial direction of the disk-shaped structure 14 between the vertices of adjacent projections was uniform and was about 2 $\mu$m.

Figure 1C:
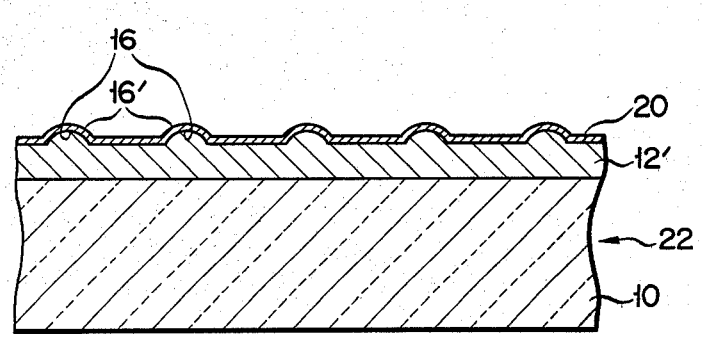

In FIG. 1C, a metal film 20 such as an Au film is deposited on the top surface, over the projections 16, of the layer 12 of a disk-shaped structure 18 of FIG. 1B. The Au film 20 is formed by known vapor deposition to a thickness of about 200 Å. The deposition of the film 20 serves to allow easy plating in the subsequent step. The Au film 20 need not be deposited, depending upon the type of plating to be performed. The Au film 20 is thin, so that it has substantially the same identation pattern as that of the underlying layer 12. A disk-shaped structure 22 shown in FIG. 1C also has spiral projections 16' in its top surface. The disk-shaped structure 22 serves as an orginal disk (or a master disk) for mass-producing optical disks to be used for the write/read operation.

Figure 1D:
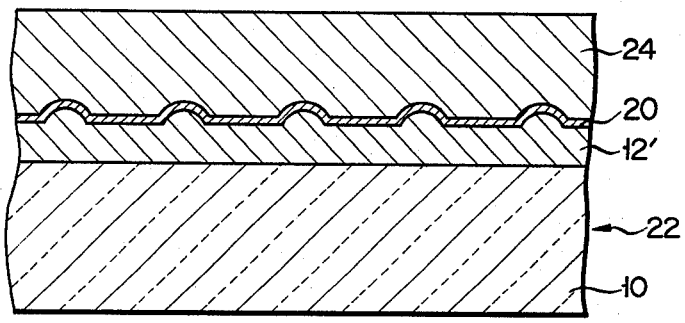
Figure 1E:
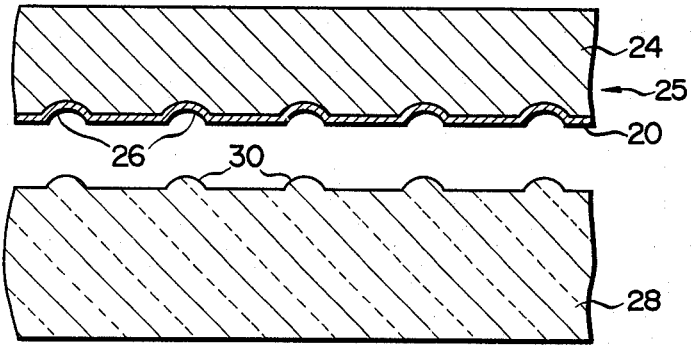
Figure 1F:
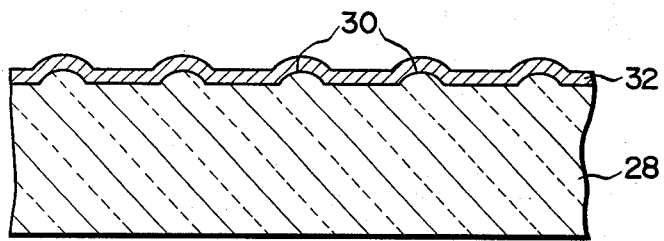
Figure 1G:
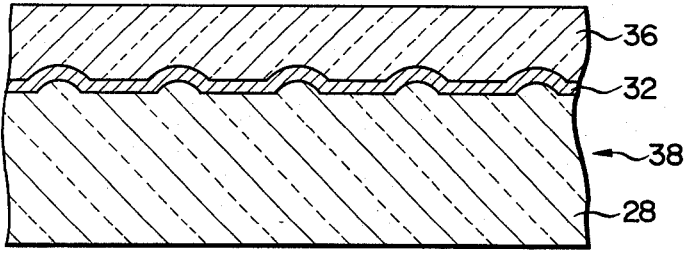

Subsequently, a layer 24 is formed by electrodeposition of Ni material (Ni-electroforming) on the disk-shaped structure or original disk 22, as shown in FIG. 1D. The electroformed Ni layer 24 was formed to a thickness of 300 $\mu$m in this embodiment. The layer 24 is then separated by a known technique from the original disk 22 so as to form a stamper 25. It is obvious that the stamper 25 has recesses 26 which have complementary shapes to those of the spiral projections 16' of the original disk 22. Using thee stamper 25, a substrate formation material such as an organic resin is injected by injection molding to form a transparent layer such as an acrylic substrate 28. The acyrylic substrate 28 has spiral projections 30 (to be referred to as spiral tracks hereinafter) on its top surface. The spiral projections 30 have substantially the same indentation pattern as the spiral projections 16'. A Te recording layer 32 is deposited by vapor deposition on the top surface of the acrylic substrate 28, as shown in FIG. 1F. In FIG. 1G, a transparent protective layer 36 is formed on the recording layer 32, thereby preparing a self-write/read type optical disk 38. The spiral projections 30 respectively correspond to the spiral tracks of the optical disk 38. In the write mode, the recording layer 32 is irradiated with the write laser beam, which digitally represents the information to be recorded, along the spiral tracks 30 of the optical disk 38, thereby forming a pit array on the spiral tracks. In the read mode, the read laser beam irradiates the optical disk 38 along the spiral tracks 30, thereby reading out the stored data corresponding to the pit array. Servo tracking control is performed in accordance with a tracking error signal which indicates a difference between the laser beam spot position and the corresponding track 30. The tracking error signal is obtained from a difference between the intensity of the reflected light when the laser spot is positioned on the spiral track 30 of the recording layer 32 and the intensity of the reflected light when the laser spot is deviated from the corresponding spiral track 30 in the radial direction of the optical disk 38. The difference between these light beams is preferably large so as to obtain high-sensitivity servo tracking control. In the optical disk 38 obtained with the method shown in FIGS. 1A through 1G, when the modulation degree of the tracking error signal was actually measured, data having a modulation degree of 20% were obtained. A pit array was formed on the tracks 30 of the recording layer 32 of the optical disk 38 using the pulse-modulated write laser beam corresponding to the write data. Thereafter, using the read lser beam, the recorded data was reproduced. The readout signal had a modulation degree of 70%. According to these measured values, the optical disk 38 according to the present invention has good modulation/demodulation characteristics as an optical data recording medium.

According to the method for manufacturing the optical disk according to the first embodiment, the layer 12 which absorbs beam energy and discharges a gas in accordance with the absorbed energy can be provided on its own to prepare the original disk 22, without using the photoresist film. The continuous spiral projection 16 is formed on the layer 12 by irradiation with th laser beam for forming the pretracks. Therefore, even if the track size is as small as 0.1 $\mu$m in depth and 1 $\mu$m in width or is even smaller, highly precise tracks can be easily formed over the entire surface of the substrate 10. Therefore, the track pitch of the optical disk 38 can be decreased, thereby further increasing the recording density of the optical disk 38.

Figure 2A:
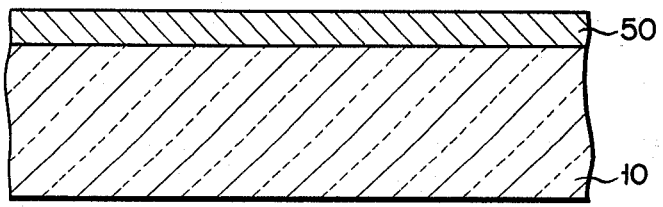
FIG. 2 illustrates, in schematic cross-section, some of the major steps in manufacturing an optical disk according to a second embodiment of the present invention.
Figure 2B:
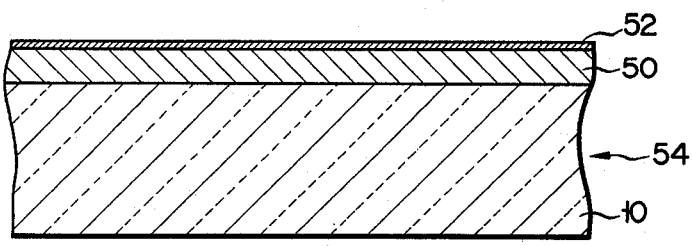

A method for manufacturing an optical disk according to a second embodiment of the present invention will be described with reference to FIGS. 2A to 2H. The same reference numerals as used in FIGS. 1A to 1G denote the same parts in FIGS. 2A to 2H. Referring to FIG. 2A, a layer 50 of 3,000 Å thickness was deposited on a disk-shaped glass substrate 10 having a diameter of 300 mm. The layer 50 comprised a material which had a composition of $Te_{50}C_{30}N_{10}H_{10}$ and which absorbs the beam energy and discharges a gas in accordance with the absorbed energy. The layer 50 was formed by sputtering using a $CH_4$ and $NH_3$ plasma gas mixture, and Te as a target. Subsequently, as shown in FIG. 2B, an Au film 52 was deposited on the layer 50 to a thickness of about 300 Å. The formation of the Au film 52 is performed by sputtering using Ar gas plasma, and Au as a target.

Figure 2C:
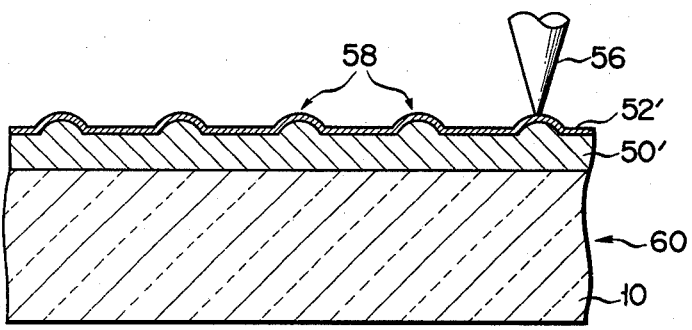

A disk-shaped structure 54 obtained by the step shown in FIG. 2B was rotated, while an Ar laser beam 56 was focused on the Au film 52 of the disk-shaped structure 54 to have a beam spot of 1 μm in diameter. The Ar laser beam 56 is moved at a constant speed along the radial direction of the disk-shaped structure 54. The Ar laser beam 56 is incident on the disk-shaped structure 54 from the Au film side, as illustrated in FIG. 2C. The rotational speed of the disk-shaped structure 54 was set in this instance to be 4 m/sec, and the Ar laser had a power of 15 mW. In this manner, the Ar laser beam 56 is moved and irradiates the layer 50 and the film 52 of the structure 54 to form projections 58 each of which has a width of 1 μm and a height of 0.1 μm, for example. Since the laser power was kept at a predetermined value (15 mW), the projections (to be referred to as spiral tracks) 58 were uniformly formed over the entire surface of an original disk 60 as shown in FIG. 2C.

Figure 2D:
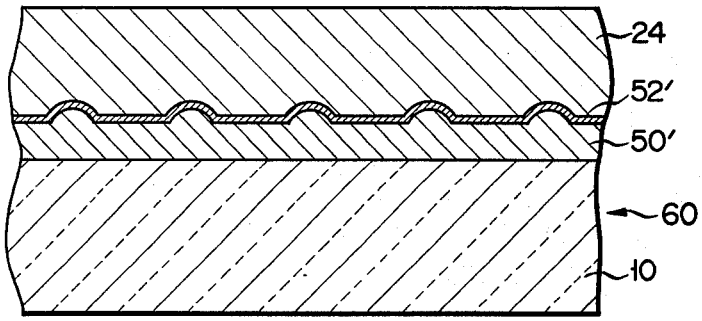

An Au film 52' having the spiral tracks 58 is used as an electrode for Ni-electroforming. As a result, a stamper 25 of an Ni layer 24 having 300 μm thickness is formed as shown in FIG. 2D. Subsequently, an ultraviolet-curing resin material is uniformly applied to a top surface 62a of an acrylic substrate 62 obtained by injection molding. Thus, an unltraviolet-curing resin layer 64 is formed on the acrylic substrate 62, as shown in FIG. 2E. The stamper 25 is pressed against the ultraviolet-curing resin layer 64 on the acrylic substrate 62 in the direction indicated by an arrow 65 in FIG. 2E. Furthermore, a bottom surface 62b of the acrylic substrate 62 is irradiated with an ultraviolet ray 66 from a known high-pressure mercury lamp (not shown) of 80 W/cm for three seconds, as shown in FIG. 2E. As a result, the layer 64 on the acrylic substrate 62 is cured to have a complementary indentation pattern to that of the stamper 25, as shown in FIG. 2F. A structure 67 thus obtained, which comprises the acrylic substrate 62 having thereon an ultraviolet-curing resin layer 64' which itself has spiral tracks 68 (substantially corresponding to the spiral projections of the original disk 60) formed thereon, is separated from the stamper 25. The structure 67 is thus prepared by transferring the spiral recesses 26 of the stamper 25.

Subsequently, a Te recording layer 32 is formed by vacuum deposition on the top surface of the structure 67, that is, on the ultraviolet-curing resin layer 64' formed on the acrylic substrate 62. A protective layer 36 (FIG. 2H) is then deposited by vacuum deposition on the recording layer 32, thereby manufacturing an optical disk 70. The modulation degree of the tracking error signal with respect to the optical disk 70 prepared according to the second embodiment was 25%, while the modulation degree of the read signal was 80%.

According to the optical disk 70 of the second embodiment, the tracking error and the modulation of the read signal are further improved. Therefore, an optical disk can be manufactured which can be expected to further improve highly precise servo tracking control.

A proper intensity range of the laser beam used to irradiate the laser-sensitive layers 12 or 50 so as to decrease a modulation degree Mt (e.g., $0 < Mt < 20$) of the tracking error signal of the optical disk and increase a modulation degree Ms (e.g., $Ms > 40$) of the read signal will be described in accordance with an experiment.

In this experiment, the glass substrate 10 was formed to have a disk shape with a diameter of 300 mm. The laser-sensitive layer 50 formed on the glass substrate 10 was made of a material having a composition of $Te_{50}C_{40}H_{10}$ and a uniform thickness of 3,500 Å. The layer 50 was formed by sputtering using $CH_4$ gas plasma and Te as a target. The Au film 52 was deposited on the layer 50 to a thickness of 300 Å. The formation of the Au film 52 was performed by sputtering using Ar gas plasma and Au as a target. The obtained structure 54 was then rotated, while the Ar laser beam 56 was focused on the layer 50 from the Au film side of the structure 54 to form a beam spot which was moved along the radial direction of the disk-shaped structure 54, thereby forming spiral projections 58 on the layer 50. The rotational speed of the structure 54 was controlled to be 3 m/sec at a portion on which the beam spot was formed. In order to readily obtain data indicating changes in the modulation degrees Mt and Ms with respect to changes in intensity of the Ar laser beam, the energy intensity of the Ar laser beam was controlled such that small areas aligned along the radial direction of the structure 54 received beams of different intensity. As a result, small erupted portions having different shapes in accordance with the intensity of the laser beam were obtained. Ni-electroforming was then performed using the Au film 52 as an electrode. Thereafter, the glass substrate 10 and the $Te_{50}C_{40}H_{10}$ film 50 were separated from the structure 60 to obtain a stamper. Using this stamper, acrylic resin was injection molded, and a recording layer consisting of a Te film with a thickness of 400 Å was formed to prepare a self-write/read type optical disk called a "substrate". A pulsate laser beam, generated from the GaAlAs laser oscillator and having an energy of 4 mW and pulse period of 400 n sec. was focused on each small projected portion having a different shape from any other small projected portion, thereby forming a pit train in the Te film to record the information therein. Consequently, a constant read laser having an energy of 1 mW was projected onto the recording layer of Te to reproduce the information. When the Ar laser power was increased to exceed a predetermined level, the laser-irradiated expanded portion of the structure 54 was undesirably deformed to form a pit without forming the projection 58. Assume that the minimum energy intensity for deforming the projection of the laser beam is defined as $I_{th}$, and that the actual intensity of the laser beam is defined as I. When an Ar laser beam having a ratio $I/I_{th}$ of 0.4 was focused on a portion of the recording medium having the $Te_{50}C_{40}H_{10}$ layer or laser-sensitive layer, the modulation degree of the tracking error signal at this portion was not more than 2%. When an Ar laser beam having a ratio $I/I_{th}$ of 0.95 or more was focused on another portion of the laser-sensitive layer, the modulation degree of the tracking error signal of this recording medium at this portion was 50%, whereas the modulation degree Ms of the information read signal was lowered to not more than 50%. However, when a laser beam having a range ($0.4 < I/I_{th} < 0.9$) was used, the modulation degree Mt of the tracking error signal was about 20%, whereas the modulation degree Ms of the information read signal was more than 60%. Therefore, the actual energy intensity of the laser beam for forming projections on the laser-sensitive layer must satisfy the range ($0.4 < I/I_{th} < 0.9$) so as to obtain a highly precise projected pattern and to manufacture a high-performance optical disk. Furthermore, in accordance with the present invention, it is possible to obtain a sufficient tracking error signal to effect proper tracking servo control operation. The tracking error signal can be arranged to have a prescribed signal level, so that it can be distinct from the information reproduction signal. Accordingly, the information signal can have a higher signal level and thus obtain excellent information reproduction.

Although the present invention has been shown and described with respect to particular embodiments, nevertheless, various changes and modifications which are obvious to a person skilled in the art to which the invention pertains are deemed to lie within the spirit, scope, and contemplation of the invention.

For example, the self-write/read type optical disk has been described with reference to the preferred embodiments. However, the present invention can be readily applied to mass production of a read-only optical disk. If the laser beam 15 described with reference to FIG. 1B (or FIG. 2C) is an information write beam which is pulse-modulated to digitally indicate desired information such as document information, a projected pattern which incorporates a pit array to indicate the recorded data is formed on the layer 12 (or 50). In this case, the structure 18 (or 60 in FIG. 2C) serves as an original disk for mass-producing read-only optical disks.

The energy-absorbing and gas-discharging film need not be limited to the composition described in the above embodiments. For example, any other material having a composition of $Te_{80}N_{10}O_{10}$ or $Te_{90}I_{10}$ could provide the same effect as obtained in the above embodiments. Any other metal film can be used as a metal film to be deposited on the laser-sensitive layer. For example, when Ti, Ni and Cr films were formed on $Te_{80}N_{10}O_{10}$ layers to obtain original disks, substrates formed using original disks obtained in the same manner as in the above embodiments had the same indentation pattern as the respective original disks. The modulation degrees of the tracking error signals were respectively 15%, 10% and 10%. A polycarbonate substrate used in place of the substrate for transferring the spiral indentation pattern had the same effect as the substrate used in the above embodiments of the present invention.

In the above embodiments, a case has been described in which continuous spiral tracks are formed on the substrate. However, concentric tracks may also be formed on the substrate. Furthermore, grooves may be formed in place of the ridges or projections.

If the shape of grooves or projections on the substrate must be changed in order to obtain highly precise tracking error and data read signals, a metal film may be deposited on the energy-absorbing and gas-discharging layer formed on the glass substrate so as to control the shape of the projections or grooves formed by irradiation with the laser beam. The shape of the projections or grooves is determined by the mechanical characteristics of the energy-absorbing and gas-discharging layer and by the mechanical strength, (such as ductility) of the metal film. Furthermore, the power of the laser beam may be changed to control the shape of the projections. In this case, the projections are formed at a given intensity of the laser beam. However, up to a certain level the height of the projections will increase in accordance with an increase in the intensity of the laser beam (when the intensity exceeds that level, the projections will be destroyed by excessive discharge of the gas).

According to this invention the shape of the projection 58 to be formed on the structure 60 can be varied by causing the laser beam 56 irradiated onto the structure to vary within a range of $0.4 < I/I_{th} < 0.9$. For this reason, the preformating of the disk can be achieved with respect to the projections optically identifiably for each predetermined area, apart from the track information.

What we claim is:

1. A method for manufacturing a record carrier body, comprising the steps of:

forming on a substrate a radiation-sensitive layer which absorbs energy from a laser beam with which said layer is irradiated and which locally expands and deforms due to the absorbed energy, said radiation-sensitive layer being a single layer which is made of a material capable of absorbing the laser beam energy, and which discharges a gas component and locally expands due to said discharged gas generated as a result of the absorbed energy; and radiating a laser beam of a suitable energy onto said radiation-sensitive layer to form an optically identifiable projected pattern, thereby forming the record carrier body for storing information corresponding to the beam.

2. A method according to claim 1, wherein said beam irradiating step includes a beam irradiation control step of focusing the beam on said radiation-sensitive layer in such a way that the beam has a stable and preselected energy level smaller than an energy level at which said radiation-sensitive layer is partially melted, whereby a projected pattern having a height on an order of submicrons is formed on said radiation-sensitive layer when said radiation-sensitive layer is irradiated with the beam having said preselected energy level.

3. A method according to claim 2, wherein said beam irradiation control step includes rotating said record carrier body, steadily setting the beam at the preselected energy level, and irradiating said radiation-sensitive layer with the beam, whereby a continuous spiral projected pattern is formed on said radiation-sensitive layer.

4. A method according to claim 2, wherein said beam irradiation control step includes rotating said record carrier body, steadily setting the beam at the preselected energy level, and irradiating said radiation-sensitive layer with the beam so as to form a beam spot which is intermittently moved along a radial direction of said record carrier body, whereby a pattern having a plurality of concentric projections is formed on said radiation-sensitive layer.

5. A method according to claim 2, wherein said beam irradiation control step includes rotating said record carrier body, discontinuously setting the beam at the preselected energy level so as to digitally represent information to be recorded, and irradiating said radiation-sensitive layer with the beam so as to move the beam spot along the radial direction of said record carrier body, whereby a projected pattern which corresponds to a pit array to indicate the recorded information is formed on said radiation-sensitive layer.

6. A method according to claim 2, wherein said preselected energy level of the beam falls within a range between 0.4 to 0.9 times a minimum energy level which is required to at least partially form a hole in said radiation-sensitive layer.

7. A method according to claim 3, further comprising the steps of:
adopting said record carrier body having said radiation-sensitive layer with the projected pattern to be an original recording medium for mass-producing self-write/read recording media, and forming a stamper having a surface indentation pattern complementary to the projected pattern of said record carrier body formed thereon; and
forming a plurality of record carrier bodies each having the same surface indentation as said original recording medium, using said stamper, each of which said recording carrier bodies serving as a recording medium which has pretracks thereon and provides a self-write/read function.

8. A method according to claim 4, further comprising the steps of:
adopting said record carrier body having said radiation-sensitive layer with the projected pattern to be an original recording medium for mass-producing self-write/read recording media, and forming a stamper having a surface indentation pattern complementary to the projected pattern of said record carrier body formed thereon; and
forming a plurality of record carrier bodies using said stamper, each having the same surface indentation as said original recording medium, each of said recording carrier bodies serving as a recording medium which has pretracks thereon and provides a self-write/read function.

9. A method according to claim 5, further comprising the steps of:
adopting said record carrier body having said radiation-sensitive layer with the projected pattern to be an original recording medium for mass-producing read-only recording media which respectively have recorded data thereon, and forming a stamper having a complementary surface indentation pattern to the projected pattern to a discontinuous projected pattern of said record carrier body; and
forming a plurality of record carrier bodies each having the same surface indentation as said original recording medium, using said stamper, said record carrier bodies respectively serving as the read-only recording media.

10. A method for manufacturing an optical disk, comprising:
a first step of forming, on a disk-shaped substrate, a single laser-sensitive layer which absorbs energy from a laser beam with which said layer is irradiated and which locally expands and deforms due to the absorbed energy by discharging a gas;
a second step of irradiating said laser-sensitive layer with a laser beam having a laser energy level smaller than a minimum laser energy level which is required to at least partially form a pit in said laser-sensitive layer, and forming a projected pattern having a height on an order of submicrons thereon, thereby forming an original disk for storing information corresponding to radiation of the laser beam;
a third step of forming a stamper having a complementary groove pattern to the projected pattern of the original disk formed thereon; and
a fourth step of forming a pattern on a disk-shaped substrate of an organic resin by using said stamper, siad pattern on the disk-shaped substrate of the organic resin corresponding to the projected pattern of the original disk.

11. A method according to claim 10, wherein said second step includes:
forming a metallic film on said laser-sensitive layer before the projected pattern is formed on said laser-sensitive layer, said metallic film allowing effective transmission of layer beam energy therethrough, expanding when a force exceeding an elastic limit of said metallic film is applied and being readily separated from said laser-sensitive layer;
irradiating said laser-sensitive layer with the laser beam through said metallic film.

12. A method according to claim 10, wherein said second step includes forming a metallic film on said laser-sensitive layer so as to peel off therefrom after the projected pattern is formed on said laser-sensitive layer.

13. A method according to claim 10, wherein the energy level of the laser beam is preset to fall within a range between 0.4 and 0.9 times the minimum laser energy level required for at least partially forming a pit in said laser-sensitive layer.

14. A method according to claim 12, wherein the third step includes forming said stamper, using said metallic film, as an electrode in accordance with an electroforming technique.

15. A method according to claim 13, wherein the third step includes forming said stamper, using said metallic film, as an electrode in accordance with an electroforming technique.

16. A method according to claim 10, wherein said second step includes performing substantially continuous irradiation of said laser-sensitive layer with the laser beam, thereby forming a self-write/read original disk for storing track information in said laser-sensitive layer.

17. A method according to claim 10, wherein said second step includes irradiating said laser-sensitive layer with a pulse-modulated laser beam which indicates digital data to be recorded, thereby forming a read-only original disk for directly storing recorded data in said laser-sensitive layer.

* * * * *